United States Patent [19]

Rapp

[11] Patent Number: 4,746,529
[45] Date of Patent: May 24, 1988

[54] PROCESS AND APPARATUS FOR THE CONTINUOUS REFINING OF ROLLING STOCK AS THE STARTING PRODUCT FOR CHOCOLATE

[75] Inventor: Rudolf Rapp, Überlingen, Fed. Rep. of Germany

[73] Assignee: Werner & Pfleiderer GmbH, Stuttgart, Fed. Rep. of Germany

[21] Appl. No.: 817,732

[22] PCT Filed: May 9, 1985

[86] PCT No.: PCT/EP85/00214

§ 371 Date: Dec. 20, 1985

§ 102(e) Date: Dec. 20, 1985

[87] PCT Pub. No.: WO85/05012

PCT Pub. Date: Nov. 21, 1985

[30] Foreign Application Priority Data

May 9, 1984 [DE] Fed. Rep. of Germany ....... 3417126

[51] Int. Cl.[4] ............................................. A23G 1/00
[52] U.S. Cl. ................................. 426/660; 426/631; 426/613
[58] Field of Search ............... 426/631, 474, 481, 475, 426/593, 660, 476, 482, 486, 519, 520, 487, 613; 99/236 R, 236 CC, 134, 485, 348

[56] References Cited

U.S. PATENT DOCUMENTS

| | | | |
|---|---|---|---|
| 2,070,558 | 2/1937 | Beck | 426/520 |
| 2,348,743 | 5/1944 | Hollstein | 426/474 |
| 2,441,861 | 5/1948 | Widen | 426/476 |
| 3,682,086 | 8/1972 | Ocker | 426/631 |
| 3,904,777 | 9/1975 | Goerling et al. | 426/631 |
| 3,955,489 | 5/1976 | Goerling et al. | 426/485 |

FOREIGN PATENT DOCUMENTS

| | | |
|---|---|---|
| 0032217 | 7/1981 | European Pat. Off. . |
| 0063163 | 10/1982 | European Pat. Off. . |
| 0140729 | 5/1985 | European Pat. Off. . |
| 0661846 | 6/1938 | Fed. Rep. of Germany . |
| 2341639C3 | 5/1974 | Fed. Rep. of Germany . |
| 2743246 | 3/1979 | Fed. Rep. of Germany . |
| 3112994A1 | 7/1982 | Fed. Rep. of Germany . |
| 1558215 | 3/1968 | France . |
| 1567475 | 5/1969 | France . |
| 222202 | 10/1974 | France . |
| 2303484 | 10/1976 | France ................. 426/660 |

*Primary Examiner*—Jeanette Hunter
*Attorney, Agent, or Firm*—Morgan & Finnegan

[57] ABSTRACT

The invention relates to a process for the continuous refining of rolling stock as the starting product for chocolate, in which thin-layer-roasted cocoa mass is employed as the basis for the formulations in addition to water, carbohydrates and a milk component, wherein the carbohydrate and milk are up to 20% by dry weight. The rolling stock is introduced into an open, heatable system, in which it is degassed under vacuum and is intimately mixed with supplied gas and/or supplied air at temperatures of between 80° and 120° C. and is then plasticized, the plasticized rolling stock is thereupon introduced into a closed system, in which it is homogenized.

14 Claims, 1 Drawing Sheet

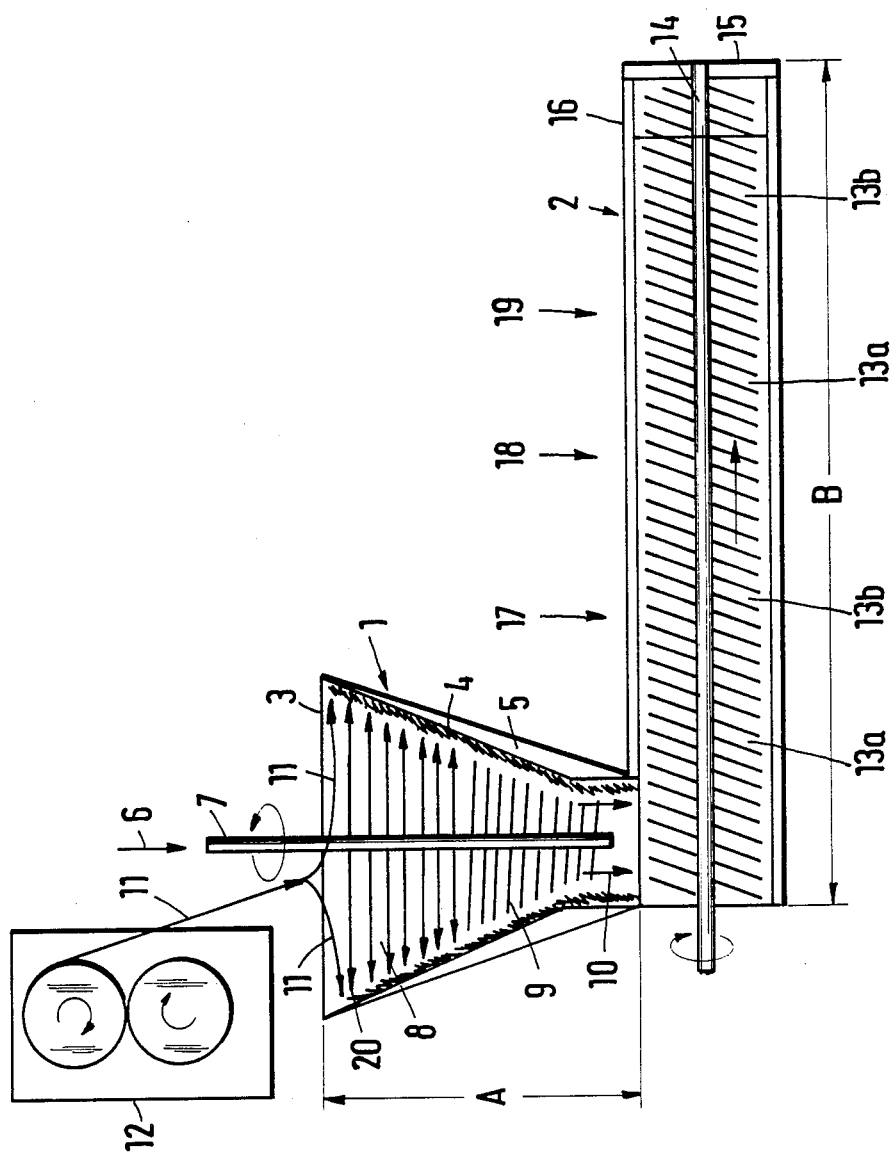

PROCESS AND APPARATUS FOR THE CONTINUOUS REFINING OF ROLLING STOCK AS THE STARTING PRODUCT FOR CHOCOLATE

BACKGROUND OF THE INVENTION

The invention relates to a process as well as an apparatus for the refining of rolling stock as the starting product for chocolate.

In the production of chocolate, the stock comminuted by means of roller frames, such stock containing almost all of the components of the recipes, is still today filled into so-called conching means and is liquefied therein over a period of time of many hours. This process requires very much space for the apparatus elements necessary for carrying it through, and moreover it operates discontinuously, so that it must be regarded as outdated considering today's high state of the automation technique. There has not been a lack of attempts at having the process run off continuously. These attempts ultimately failed on account of the fact that either the modes of conducting the process found were too complicated and, hence, uneconomical, or the result, hence the product quality, have not been satisfactory.

All process techniques in the production of chocolate based on the principle of conching have in common that work is conducted in large, open, temperable containers, in which there are disposed specially designed mechanical built-in structures which in some form circulate the stock. These built-in structures consist of varyingly shaped agitating and kneading members, which serve to bring about as large as possible a surface area of the stock so as to cause an intensive exchange of materials at the boundary surface of product mass/air, and they form as well variously shaped gaps, through which the chocolate mass is pressed. In that way high shearing forces result, which cause the envelopment of the solid particles with cocoa butter, the so-called buttering (oiling), whereby there is attained not only a good flow behaviour but, rather, also a good melting characteristic in the finished chocolate. The increased temperature accelerates the exchange of materials (substances). After a predetermined time of conching, the flavor refining can be considered as concluded.

Substantially undesirable aroma substances are removed from the product through the conching process in a first treatment phase under mild mechanical stress. In a second treatment phase, the buttering required for the glaze is attained through intensified mechanical processing, and the flow behaviour required for the further processing is adjusted. It is decisive in that regard that the entire flavour-developing process conduction, inclusive of the mechanical treatment, for attaining a good flow behaviour be divided up into various processing segments. For example, the raw cocoa mass must be pre-degassed and pre-refined under the addition of water or of specific reaction solutions, and the resultant product roasted in a thin layer and further refined by means of reaction solutions, for example carbohydrates. It has been shown that the simple degassing or roasting of cocoa mass in a thin layer does not suffice in order to allow all necessary materials exchange operations between the components of the cocoa mass and the carbohydrates or also milk components to take place. On the other hand, no purposive reactions can occur between the reaction partners in the conching means, as only random contacts between the reaction partners result in the conching means. Moreover, conching of the type used so far is a discontinuous method and, consequently, is of disadvantage not only for energetic reasons but, rather, also in respect of attaining a uniform product quality.

Furthermore, according to present day recognitions, a pre-degassing of the cocoa mass or a pre-treatment of the milk components is not sufficient to ensure the intended product quality at a later liquification of the product in a conching means or also by way of a continuous method.

SUMMARY OF THE INVENTION

One object of the invention is, therefore, to further develop the process of the type mentioned at the outset, in which the refining of the cocoa product is regarded to be a prerequisite for a later continuous refining liquification of the chocolate mass, such that an improvement in materials and heat exchange of the reaction components of the cocoa mass is achieved after the recipes components have been put together and after the subsequent comminution upon an increase in surface area of the product mass by a factor that is greater than $10^4$.

A further object of the invention is to provide an improved apparatus for carrying out the process of the invention.

Another object of the invention is to provide a continuous mode of procedure upon the refining of cocoa masses at an excellent energetic efficiency upon an excellent quality of the end product.

These and other objects are solved according to the invention by the fact that the rolling stock is introduced into an open, heatable system, in which it is degassed under negative pressure (vacuum) and is intimately mixed with supplied gas and/or supplied air at temperatures between 80° and 120° C. and is then plasticized, and by the fact that the plasticized rolled stock is thereupon introduced into a closed system, in which it is homogenized.

With respect to the apparatus-technique parts of the invention, the solution of the object is seen to reside in the fact that the process is carried out through an open system in the form of a vertical, funnel-shaped reactor spreading and degassing the rolling stock as well as gassing it with air and/or a gas, and through a closed system directly following said open system and being in the form of a worm-type extruder for homogenizing the rolling stock emerging from the reactor.

Hence, an essential process feature is the stock treatment at first in an open system for the purpose of degassing the rolling stock, wherein the resultant gases are conducted away immediately, and the stock is pre-plasticized with increasing duration of treatment, as it has turned out that previous degassing plays an important role for the later flowability of the product, whereupon the further treatment of the degassed product takes place in a closed system for homogenization.

According to an advantageous further development of the invention, it is possible for the purpose of a further improvement of degassing to maintain in the open system a relative negative pressure of between 20 and 200 mbar, with the rolling stock moving downwardly in the course of the treatment under the influence of gravity under the formation of a large surface area, in which respect, according to a further embodiment of the process according to the invention, the resultant vapors and gases with the undesirable aroma substances being drawn off immediately.

It has proofed serviceable, furthermore, to add cocoa butter and lecithin and/or liquid recipes components to the plasticized rolling stock in the closed system, in which the stock is exposed for the purpose of homogenization to the action of shearing and mixing elements at a definite but variable gap width.

Temperatures of from 60° to 80° C. are usefully maintained, for the purpose of homogenization, within the shearing zones and mixing zones, which advantageously are alternating.

The residence time of the rolling stock in the mixing zone should be at least 0.3 seconds, and the shearing duration should amount to at most 0.2 seconds.

Values of between 5 and 0.5 mm have proofed particularly favourable as gap widths.

After the rolling stock has been treated in the closed system, a further treatment in the open system may optionally follow in order to attain, at temperatures of between 60° and 80° C., a concentration equalization of the components of the recipes and thereby optimize the flow characteristics of the product.

From the standpoint of apparatus-technique, the invention is based on a combination of two continuously operating devices matched with respect to throughput performance, namely a reactor of the thin-layer type designed as gasifier and plasticizer and an extruder connected therebehind serving as homogenizer of the plasticized mass that emerges from the reactor.

DESCRIPTION OF THE DRAWINGS

The invention will be explained below by way of the exemplary embodiments illustrated in the drawing, which shows diagrammatically the apparatus for carrying out the process.

For the production of chocolate, in particular milk chocolate, a product is continuously withdrawn at 11 from the roller frame 12, the basis of which product is thin-layer-roasted cocoa mass which provides, under the addition of reaction solutions such as water, carbohydrates and milk components, a starting product whose carbohydrate content and milk dry proportion amount up to 20% by weight. This rolled stock reaches the reactor 1 that is in upright position and tapers conically downwardly, on the inner wall of which reactor it is spread. In the upper portion of this reactor there is disposed a rotor 8 provided with nozzles 20, said rotor being mounted on a driven hollow shaft 7, through which there is introduced in the direction of the arrow 6 air or a gas, for example an inert gas, which then is blown through the nozzles 20 against the cocoa mass spread on the reactor wall, which mass according to the principle of falling runs downwardly from the upper end 3 of the reactor. The rolled stock is gassed with the aid of the nozzles 20 for the purpose of expelling undesirable aroma substances (elements) contained therein, which then escape or, respectively, are withdrawn together with the resultant vapors and gases from the reactor 1, which constitutes an open system designated by A. For this purpose, the reactor housing 4 is provided with a heatable sheath 5, with temperatures between 80° and 120° C. thus being called forth in the rolling stock, and the gas emerging from the rotating nozzles 20 being intimately mixed with the thin-layer mass stream traveling downwardly, so that a very good degassing effect occurs.

This effect of degassing can still be enhanced in that there is maintained in the reactor 1 a relative negative pressure (vacuum) of between 20 and 200 mbar with the aid of a device, which is not shown, creating a negative pressure.

With increasing duration of treatment, the powdery and partly-plasticized rolling stock across which the rotating nozzles 20 move reaches the lower portion of the reactor 1, in which a plasticizing worm 9 is disposed that is wedged onto the rotating shaft 7, said worm discharging the stock at 10 into the worm extruder 2, which in the case of this exemplary embodiment is designed as a single-shaft extruder, on whose shaft 14 shearing elements 13a and mixing elements 13b alternate in order to homogenize the product being forced through the extruder upon passage through the shearing zones and mixing zones until it emerges from the mouth piece (port) 15.

The worm-type extruder or, respectively, homogenizer constitutes a closed system B insofar as the product is treated in between the inlet and the outlet largely with the exclusion of air. The extruder is surrounded by a heatable sheath 16, so that temperatures of from 60° to 80° C. can be maintained or, respectively, adjusted therein. In the successive shearing zone and mixing zone of the homogenizer there occurs a continual change between putting together individual components of the product during shearing and surface reaction upon mixing in the subsequent mixing zone, the residence time in each mixing zone amounting to at least 0.3 seconds, and the shearing duration in the shearing zone amounting to maximally 0.2 seconds, viz. in the case of gap widths of between 5 and 0.5 mm, which becomes narrower with increasing plasticizing and, hence, increasing flowability.

There may be fed to the plasticized product at 17, 18 and 19 into the extruder cocoa butter and lecithin the latter as emulsifier, and other liquid components of the recipes, which in the shearing and mixing zones become intensively intermingled with the product mass and bring about the desired reactions, so that this continuous refining process results in a high-quality end product, such as it can be attained only with a substantially greater technical and energetic effort, if at all, with the known methods.

After the rolling stock has been treated in the closed system B, a further treatment in the open system A may, if desired, follow in order to still complete the concentration equalization of the components of the recipes at temperatures of between 60° and 80° C. and in order to thereby obtain optimum flow characteristics. Usually, however, the processing of the rolling stock in the above-described apparatus with a single passage through the open system A and the closed system B suffices in order to attain the desired end quality.

Having described our invention, however, many modifications thereof will become apparent to those skilled in the art without deviating from the spirit of the invention as defined by the following claims.

What is claimed is:

1. A process for continuously producing chocolate from a mixture comprising a thin-layered-roasted cocoa mass, water, carbohydrates and milk components, said carbohydrates and milk components being present in said mixture on a dry basis in an amount of up to 20% by weight, and said mixture having been rolled to form rolling stock material as the starting material, comprising continuously introducing said rolling stock material into an open, heatable system and spreading and degassing said rolling stock material under a negative pressure between 20 and 200 mbar and refining the same, thereafter continuously supplying gas or air, or a mixture of gas and air, at temperatures between 80° C. and 120° C., to the refined spreaded and degassed rolling stock material and intimately mixing and plasticizing said spreaded and degassed rolling stock material, and thereafter continuously introducing the intimately mixed and plasticized rolling stock material into a closed system and subjecting said intimately mixed and plasticized rolling stock mixture to shearing and mixing forces therein and homogenizing the same and forming a chocolate end product.

2. A process according to claim 1 wherein the degassed and intimately mixed rolling stock material moves downwardly by gravity from the open heatable system into the closed system.

3. A process according to claim 1 including withdrawing the vapors and gases resulting from degassing the rolling stock material and removing undesirable aroma substances contained in said rolling stock material with the withdrawn vapors and gases.

4. A process according to claim 1 wherein the duration of treatment in the open system is increased and the rolling stock material is completely plasticized therein.

5. A process according to claim 1 wherein cocoa butter, lecithin or other liquid recipe components are added to the plasticized rolling stock material.

6. A process according to claim 1 wherein the cocoa butter, lecithin or other liquid recipe components are added to the plasticized rolling stock material in the closed system.

7. A process according to claim 1 wherein homogenization is carried out with a worm extruder provided with shearing and mixing elements of specified but variable gap widths.

8. A process according to claim 2 wherein homogenization of the plasticized rolling stock material in the worm extruder is carried out at temperatures from 60° to 80° C., the warm extruder is provided with alternate shearing and mixing elements forming shearing and mixing zones, and surface reactions occur in the mixing zones between the individual components of the newly formed plasticized rolling stock material resulting from the shearing action in said shearing zones.

9. A process according to claim 8 wherein the residence time of the plasticized rolling stock material in each mixing zone is at least 0.3 seconds and the duration of shearing is at most 0.2 seconds.

10. A process according to claim 7 wherein the gap widths of the shearing elements of the worm extruder are progressively narrower with increasing plasticization of the plasticized rolling stock material resulting in increased flowability of said plasticized rolling stock material.

11. A process according to claim 7 wherein the gap widths of the shearing elements are between 5 mm and 0.5 mm.

12. A process according to claim 7 wherein the gap widths of the shearing elements of the worm extruder are 1 mm.

13. A process according to claim 1 including, after treatment of the rolling stock material in the closed system, returning said rolling stock material to the open system and subjecting the same to temperatures between 60° C. and 80° C., equalizing the concentration of the components of said rolling stock material and providing an optimum flow limit in said rolling stock material.

14. A process according to claim 1 wherein a double worm extruder is employed to homogenize the rolling stock material in the closed system.

* * * * *